United States Patent
Lee

Patent Number: 5,483,300
Date of Patent: Jan. 9, 1996

[54] OUTPUT CIRCUIT

[75] Inventor: Kyoung-geun Lee, Ansan, Rep. of Korea

[73] Assignee: Samsung Electronics Co., Ltd., Kyungki-Do, Rep. of Korea

[21] Appl. No.: 264,331

[22] Filed: Jun. 23, 1994

[30]   Foreign Application Priority Data

Jun. 23, 1993  [KR]  Rep. of Korea .................. 93-11521

[51] Int. Cl.⁶ ............................................. H04N 17/04
[52] U.S. Cl. ................. 348/745; 348/190; 315/368.18
[58] Field of Search ................................. 348/745, 747, 348/806, 807, 180, 184, 189, 190; 315/368.11, 368.18, 368.19, 368.25, 368.26, 368.27, 368.28

[56]    References Cited

U.S. PATENT DOCUMENTS

| 4,032,819 | 6/1977 | Henley et al. ............ | 315/368.18 |
| 4,801,852 | 1/1989 | Kashiwagi ................. | 348/747 |
| 4,961,030 | 10/1990 | Ogino et al. .............. | 348/746 |
| 4,982,276 | 1/1991 | Kawashima et al. ...... | 348/745 |
| 5,237,246 | 8/1993 | Gleim ...................... | 348/745 X |
| 5,389,859 | 2/1995 | Stessen et al. ........... | 315/368.12 |

*Primary Examiner*—Victor R. Kostak
*Attorney, Agent, or Firm*—Sughrue, Mion, Zinn, Macpeak & Seas

[57]    ABSTRACT

A convergence output circuit for converging signals corresponding to the primary colors of an input video signal which reduces power loss by including a positive power source voltage supply circuit for supplying a first voltage to a first current supply circuit during a blanking period of the input video signal and for supplying a second voltage, lower than the first voltage, to the first current supply circuit during a scanning period of the video signal, both the first and second voltages being positive. A negative power source voltage supply circuit supplies a third voltage, opposite in polarity to the first voltage, to the second current supply circuit during the blanking period and supplies a fourth voltage, opposite in polarity to the second voltage, to the second current supply circuit during the scanning period, both the third and fourth voltages being negative.

11 Claims, 3 Drawing Sheets

OUTPUT CIRCUIT

BACKGROUND OF THE INVENTION

The present invention relates to an output circuit, and more particularly, to a convergence output circuit for decreasing power consumption in a projection television.

Generally, a projection-type color picture tube enlarges and projects an image onto a screen by means of three projection tubes each emitting one of three primary colors. The incident angle from a projection tube to the screen is different for each projection tube. The difference in incident angle from each projection tube results in color deviation of the image reproduced on the screen. The superposition of these three colors (hereinafter referred to as convergence) is controlled by varying the amplitude and shape of a convergence compensating waveform which is generated in synchronization with horizontal and vertical scanning periods of a video signal.

Conventional convergence output circuits include an amplifier U1, drive transistors Q1 and Q2, resistors R1–R4 and a convergence coil L, as shown in FIG. 1. The amplifier U1 compares an input signal $V_{IN}$, shown in FIG. 2A, applied to a non-inverting input of the amplifier U1 with a feedback signal $V_f$ applied to an inverting input of the amplifier U1, and outputs first and second output signals OS1 and OS2.

Drive transistor Q1 is a PNP bipolar transistor which includes an emitter connected to a first power source voltage (+Vcc) via a current-limiting resistor R1 and a base which receives the first output signal OS1 from the amplifier U1. Drive transistor Q2 is an NPN bipolar transistor which includes an emitter connected to a second power source voltage (–Vcc) via a current-limiting transistor R2 and a base which receives the second output signal OS2 from the amplifier U1. The collectors of the bipolar transistors Q1 and Q2 are commonly connected, with the connection point being coupled to one end of the convergence coil L via a protection resistor R3. The other end of the convergence coil L is grounded via a feedback resistor R4.

The voltage across resistor R4 is applied to the inverting input of the amplifier U1 as a feedback signal $V_f$. That is, in the conventional convergence output circuit, the emitter currents of transistors Q1 and Q2 are controlled by the voltage difference between the input signal $V_{IN}$ and the feedback signal $V_f$, both of which are applied to the amplifier U1, respectively, so that a current $I_L$ having a waveform shown in FIG. 2B is supplied to the convergence coil L. The passage of current $I_L$ through the convergence coil L deflects the electron beams so that the convergence of the three primary colors can be controlled. The voltage induced by the convergence coil L is represented by a waveform shown in FIG. 2C, wherein one period is divided into a blanking period $T_1$ and a scanning period $T_2$. Voltages $V_{T1}$ and $V_{T2}$ appearing during periods $T_1$ and $T_2$, respectively, can be expressed as follows:

$$V_{T1} = L\left(\frac{I_{p-p}}{T_1}\right) \quad (1)$$

$$V_{T2} = L\left(\frac{I_{p-p}}{T_2}\right). \quad (2)$$

Since $T_2$ is much larger than $T_1$, $V_{T1}$ is much greater than than $V_{T2}$ and $V_{T2}$ can be virtually ignored with respect to $V_{T1}$.

In order to allow transistors $Q_1$ and $Q_2$ to control the output current $I_L$ sufficiently, the first and second power source voltages +Vcc and –Vcc should be set to values such that a voltage higher than $V_{T1}$ is applied as the power source voltage of the convergence output circuit. That is, the following relationships should be satisfied:

$$+Vcc > V_{T1(max)} + (R1+R3+R4)I_{L(max)} + V_{Q1(sat)} \quad (3)$$

and $$-Vcc = -(V_{T1(max)} + (R1+R3+R4)I_{L(max)} + V_{Q2(sat)}) \quad (4)$$

where $$V_{T1(max)} = L\left(\frac{I_{p-p(max)}}{T_{1(min)}}\right). \quad (5)$$

Since the current $I_L$ flowing through the convergence coil is supplied by the power source +Vcc or –Vcc, and the voltage Vcc is significantly higher than $V_{T1}$, the power consumption PW in the convergence output circuit is as follows:

$$PW = \pm Vcc \times I_L. \quad (6)$$

The above-obtained power consumption is very large, and therefore, a problem results in that a large power supply circuit becomes necessary.

SUMMARY OF THE INVENTION

To solve the above-mentioned problem of the prior art, it is an object of the present invention to provide an output circuit for reducing power loss.

To accomplish the above object, the present invention provides a convergence output circuit, which includes:

an amplifier for amplifying an input signal;

a first current supplying circuit for producing a positive current in response to the output signal of the amplifier;

a second current supplying circuit for producing a negative current in response to another output signal of the amplifier;

a convergence coil, one end of which is connected to a common connection point between the first and second current supplying circuits, for receiving the positive and negative currents;

a feedback resistor connected between the convergence coil and ground for supplying a feedback signal to the amplifier;

a positive power source voltage supplying circuit for supplying a first voltage to the first current supplying circuit during a blanking period of an input video signal, and for supplying a second voltage to the first current supplying circuit during a scanning period of the input video signal, where the second voltage is lower than the first voltage, and where both the first and second voltages are positive; and a negative power source voltage supplying circuit for supplying a third voltage to the second current supplying circuit during the blanking period, and for supplying a fourth voltage to the second current supplying circuit during the scanning period, where both the third and fourth voltages correspond to the first and second voltages, respectively, and where the third and fourth voltages are both negative.

BRIEF DESCRIPTION OF THE DRAWINGS

The above object and advantages of the present invention will become more apparent by describing in detail a preferred embodiment of the invention with reference to the attached drawings in which.

DETAILED DESCRIPTION OF THE PREFERRED EMBODIMENT

Figure 1:
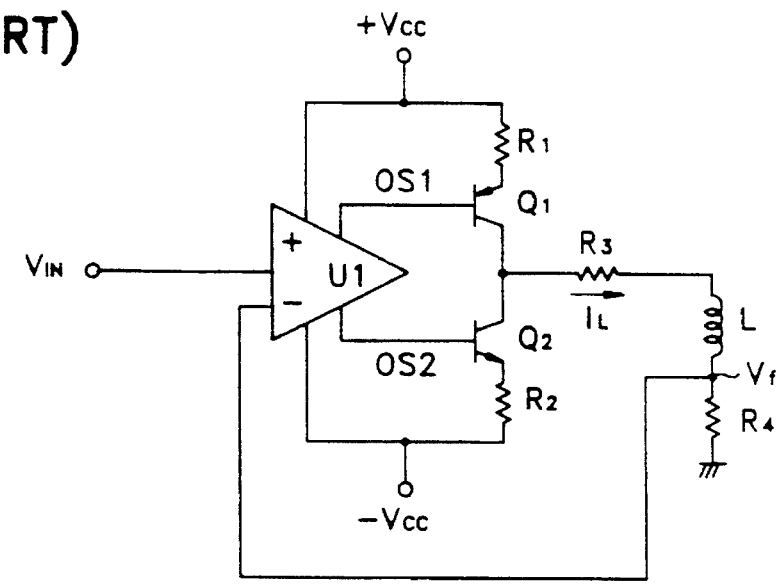
FIG. 1 shows the configuration of a conventional convergence output circuit.
Figure 2A:
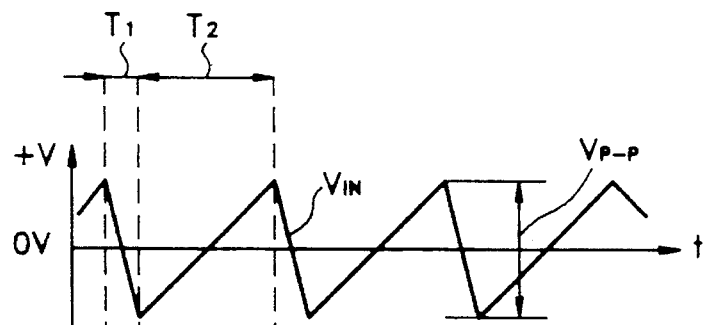
FIGS. 2A, 2B and 2C show waveforms appearing at various points of the circuit of FIG. 1.
Figure 2B:
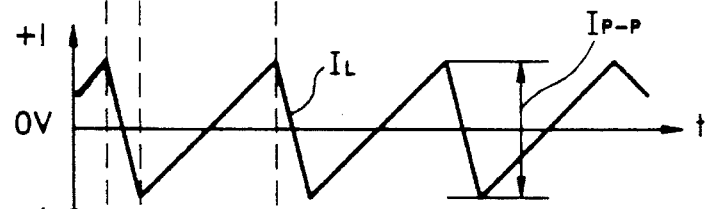
Figure 2C:
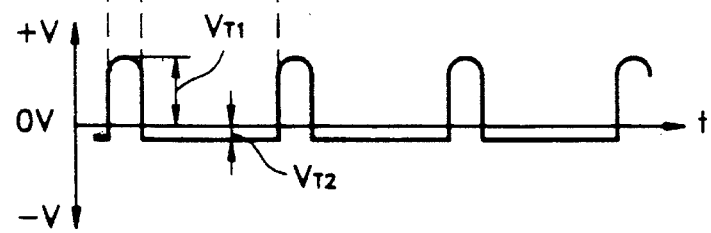
Figure 3:
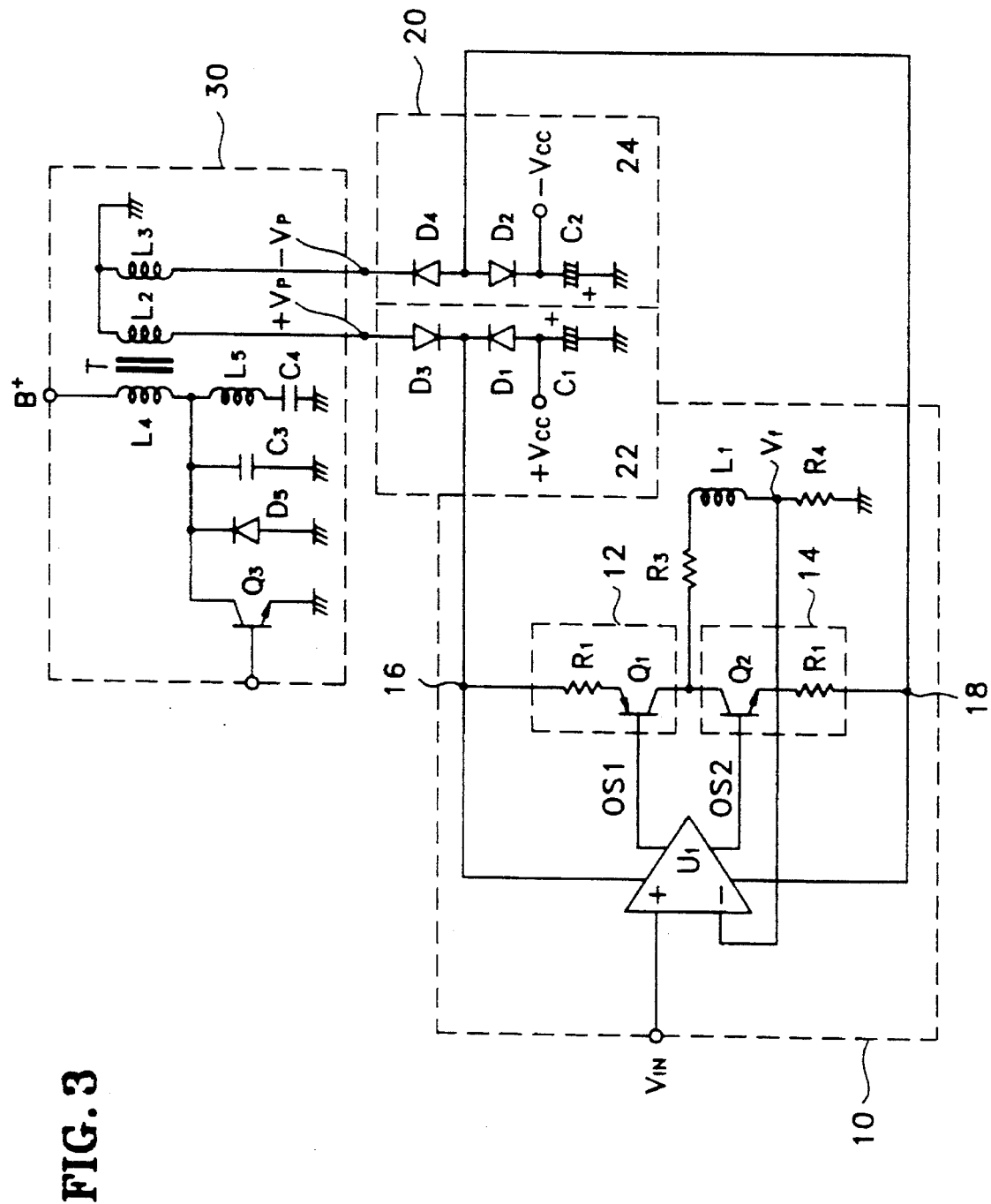
FIG. 3 shows the configuration of the convergence output circuit according to the present invention.

Referring to FIG. 3, the convergence output circuit according to the present invention largely comprises a convergence output portion 10 and a power source voltage supplying portion 20.

The convergence output portion 10 includes an amplifier U1, a first current supplier 12, a second current supplier 14, a convergence coil L1, and a feedback resistor R4. Resistor R3 represents a protection resistor.

The first current supplier 12 includes an emitter resistor R1 and a PNP bipolar transistor Q1. The second current supplier 14 includes an NPN bipolar transistor Q2 and an emitter resistor R2. The feedback resistor R4 is connected to the convergence coil L1 in series with respect to ground, to thereby produce a feedback signal $V_f$ which is supplied to the amplifier U1.

The power source voltage supplying portion 20 includes a positive power source voltage supplier 22 and a negative power source voltage supplier 24. The positive power source voltage supplier 22 superposes a power source voltage +Vcc and a positive blanking signal +Vp, which are superposed and supplied to the convergence output portion 10 as the positive power source voltage through diodes D1 and D3, respectively. The negative power source voltage supplier 24 superposes a power source voltage −Vcc and a negative blanking signal −Vp, which are superposed and supplied to the convergence output portion 10 as the negative power source voltage through diodes D2 and D4, respectively.

Figure 4A:
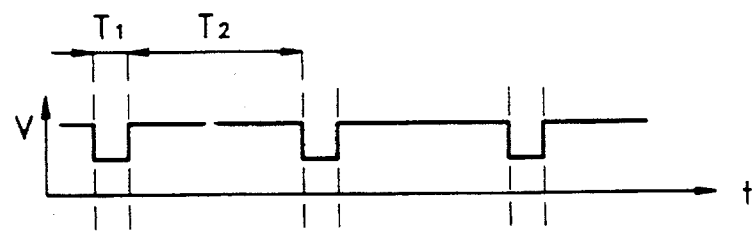
FIGS. 4A–4F show waveforms appearing at various points of the circuit illustrated in FIG. 3.

FIGS. 4A–4F show waveforms appearing at various points of the circuit illustrated in FIG. 3. FIG. 4A shows a waveform of the input image signal, wherein $T_1$ and $T_2$ denote the blanking period and the scanning period, respectively.

The positive and negative blanking signals +Vp and −Vp are respectively obtained from a first coil L2 and a second coil L3 of the secondary side of a transformer T of a horizontal deflection output portion 30. The first coil L2 has the same polarity as the primary coil L4 of the transformer T. The polarity of the second coil L3 is opposite to that of the primary coil L4. The horizontal deflection output portion 30 produces a resonating pulse voltage, shown in FIG. 4B, according to the horizontal period of the video signal, following the characteristics of a horizontal output transistor Q3, a damping diode D5, capacitors C3 and C4 and a deflection coil L5.

Figure 4B:
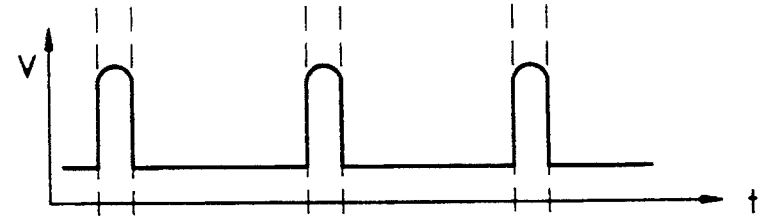
Figure 4C:
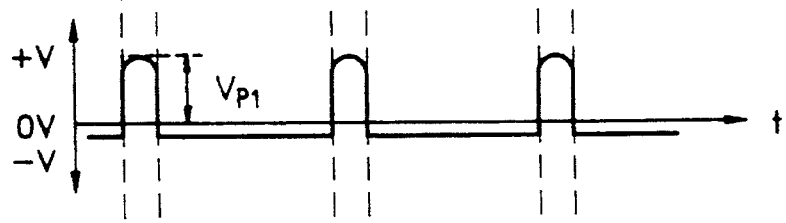
Figure 4D:
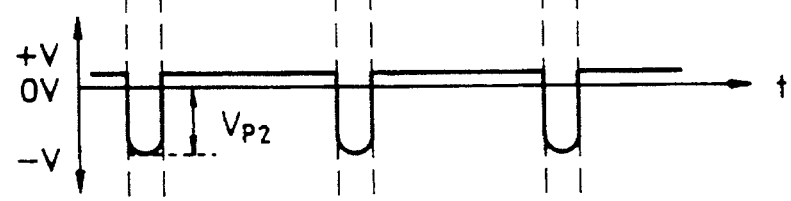
Figure 4E:
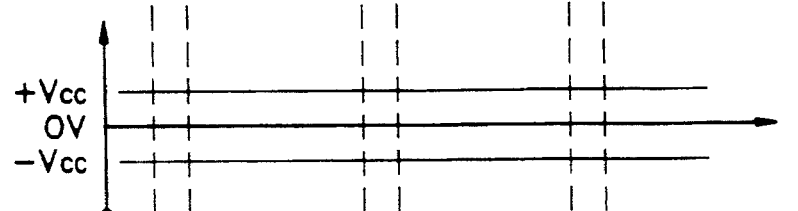

When the waveform shown in FIG. 4B is produced at the primary coil L4 of the transformer T, the positive and negative blanking signals $+V_{P1}$ and $-V_{P2}$, shown in FIGS. 4C and 4D, are produced at the coils L2 and L3 of the secondary side of the transformer T, respectively.

Figure 4F:
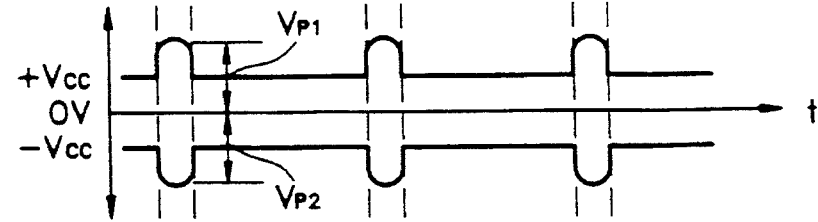

The first power source voltage supplier 22 supplies a positive power source voltage, as shown in FIG. 4F, to the positive power source node 16 of the convergence output portion 10. The second power source voltage supplier 24 supplies a negative power source voltage, also shown in FIG. 4F, to the negative power source node 18 of the convergence output portion 10.

In the convergence output portion 10, high voltages $V_{P1}$ and $V_{P2}$ are applied to the convergence coil L1 during the blanking period $T_1$, and low voltages +Vcc and −Vcc are applied to the convergence coil L1 during the scanning period $T_2$. According to this arrangement, power loss can be reduced.

More particularly, the power loss $P_{T1}$ for the blanking period $T_1$ is represented by:

$$P_{T1} = I_L V_p \left( \frac{T_1}{T_1 + T_2} \right) \qquad (7)$$

and the power loss $P_1$ for the scanning period $T_2$ is represented by:

$$P_{T2} = I_L V_{cc} \left( \frac{T_2}{T_1 + T_2} \right). \qquad (8)$$

As a result, the power loss $AP_{T1+T2}$ for one period is as follows:

$$AP_{(T1+T2)} = \frac{(I_L \times V_p) T_1 + (I_L \times V_{cc}) T_2}{T_1 + T_2}. \qquad (9)$$

Assuming that ±Vcc of the conventional convergence output circuit is Vp, the power loss $BP_{T1+T2}$ for one period is as follows:

$$BP_{(T1+T2)} = I_L V_p \left( \frac{T_1 + T_2}{T_1 + T_2} \right). \qquad (10)$$

Accordingly, by subtracting equation (9) from equation (10), the difference between the power loss in the present invention and the power loss in the prior art becomes as follows:

$$\begin{aligned} DP_{(T1+T2)} &= BP_{(T1+T2)} - AP_{(T1+T2)} \\ &= (V_p - V_{cc}) \times \left( \frac{I_L T_2}{T_1 + T_2} \right). \end{aligned} \qquad (11)$$

Since $T_1$ is much shorter than $T_2$, we can ignore $T_1$, which gives:

$$DP_{(T1+T2)} \cong (V_p - V_{cc}) I_L. \qquad (12)$$

Therefore, if $I_L$ remains constant, the difference in power loss is proportional to the ratio of Vp to Vcc.

According to the present invention, the overall power loss of the convergence output circuit can be reduced by approximately fifty percent with respect to the prior art. Also, the power loss reduction can give way to the reduction of heating in the drive transistors Q1 and Q2 of the convergence output portion. Therefore, a reduction in the heating configuration can be accomplished and design difficulties can be solved. Further, energy consumption can be reduced.

What is claimed is:

1. A convergence output circuit comprising:

an amplifier for amplifying an input video signal;

a first current supplying circuit which produces a positive current in response to a first output signal of said amplifier;

a second current supplying circuit which produces a negative current in response to a second output signal of said amplifier;

a convergence coil, having one end connected to a connection point between said first current supplying circuit and said second current supplying circuit, for receiving said positive current and said negative current;

a feedback resistor connected between said convergence coil and ground for supplying a feedback signal to said amplifier;

a positive power source voltage supplying circuit which supplies a first voltage to said first current supplying circuit during a blanking period of said input video signal and which supplies a second voltage, lower than said first voltage, to said first current supplying circuit during a scanning period of said input video signal, both said first voltage and said second voltage being positive; and a negative power source voltage supplying circuit which supplies a third voltage to said second current supplying circuit during said blanking period of said input video signal and which supplies a fourth voltage to said second current supplying circuit during said scanning period of said input video signal, both said third voltage and said fourth voltage being negative.

2. The convergence output circuit as claimed in claim 1, wherein said positive power source voltage supplying circuit comprises a first diode and a second diode having commonly connected cathodes, a capacitor having one end connected to an anode of said second diode and another end connected to ground, and a positive voltage source connected between said second diode and said capacitor.

3. The convergence output circuit as claimed in claim 1, wherein said negative power source voltage supplying circuit comprises a first diode and a second diode having commonly connected anodes, a capacitor having one end connected to a cathode of said second diode and another end connected to ground, and a negative voltage source connected between said second diode and said capacitor.

4. The convergence output circuit as claimed in claim 3, further comprising a horizontal deflection output circuit which produces at least two resonating pulses of opposite polarity and equal phase in accordance with a horizontal period of said input video signal, wherein one output terminal of said horizontal deflection output circuit is connected to a cathode of said first diode of said negative power source voltage supplying circuit.

5. The convergence output circuit as claimed in claim 2, further comprising a horizontal deflection output circuit which produces at least two resonating pulses of opposite polarity and equal phase in accordance with a horizontal period of said input video signal, wherein one output terminal of said horizontal deflection output circuit is connected to an anode of said first diode of said positive power source voltage supplying circuit.

6. The convergence output circuit as claimed in claim 1, wherein said first voltage corresponds to a predetermined power source voltage superposed with a blanking signal, and wherein said second voltage is said predetermined power source voltage.

7. The convergence output circuit as claimed in claim 6, wherein said first voltage is greater than a maximum voltage induced at said convergence coil.

8. An output circuit comprising:

an amplifier for amplifying an input signal;

a first current supplying circuit which produces a positive current in response to a first output signal of said amplifier;

a second current supplying circuit which produces a negative current in response to a second output signal of said amplifier;

an inductor, having one end connected to a connection point between said first current supplying circuit and said second current supplying circuit, which induces a voltage of a predetermined period and level according to said positive current and said negative current;

a positive power source voltage supplying circuit which supplies a first voltage to said first current supplying circuit during generation of said induced voltage, said first voltage being greater than said induced voltage, and which supplies a second voltage to said first current supplying circuit during a time when said induced voltage is not generated, said second voltage being lower than said first voltage, both said first voltage and said second voltage being positive; and a negative power source voltage supplying circuit which supplies a third voltage to said second current supplying circuit during generation of said induced voltage, and which supplies a fourth voltage to said second current supplying circuit during a time when said induced voltage is not generated, said fourth voltage being lower than said third voltage, both said third voltage and said fourth voltage being negative.

9. A convergence output circuit comprising:

an amplifier for amplifying an input signal;

a first current supplying circuit which produces a positive current in response to a first output signal of said amplifier;

a second current supplying circuit which produces a negative current in response to a second output signal of said amplifier;

a convergence coil, having one end connected to a connection point between said first current supplying circuit and said second current supplying circuit, for receiving said positive current and said negative current;

a power source voltage supply circuit which supplies a positive power source voltage to said first current supplying circuit and which supplies a negative power source voltage to said second current supplying circuit; and a horizontal deflection output circuit, coupled to said power source voltage supply circuit, which supplies a positive blanking signal and a negative blanking signal to said power source voltage supply circuit via a first terminal and a second terminal, respectively;

wherein said positive power source voltage is one of a first level and a second level, said second level being lower than said first level, wherein said positive power source voltage having said first level is supplied to said first current supplying circuit during a blanking period of said input video signal and said positive power source voltage having said second level is supplied to said first current supplying circuit during a scanning period of said input video signal; and wherein said negative power source voltage is one of a first level and a second level, said second level being lower than said first level, wherein said negative power source voltage having said first level is supplied to said second current supplying circuit during said blanking interval of said input video signal and said negative power source voltage having said second level is supplied to said second current supplying circuit during said scanning period of said input video signal.

10. The convergence output circuit as claimed in claim 9, wherein said first level of said positive power source voltage corresponds to a predetermined voltage superposed with said positive blanking signal, and said second level of said positive power source voltage corresponds to said predetermined voltage.

11. The convergence output circuit as claimed in claim 9, wherein said first level of said negative power source voltage corresponds to a predetermined voltage superposed with said negative blanking signal, and said second level of said negative power source voltage corresponds to said predetermined voltage.

* * * * *